(12) United States Patent
Liptay et al.

(10) Patent No.: US 6,751,708 B2
(45) Date of Patent: Jun. 15, 2004

(54) METHOD FOR ENSURING THAT A LINE IS PRESENT IN AN INSTRUCTION CACHE

(75) Inventors: John S. Liptay, deceased, late of Rhinebeck, NY (US), by Lynne M. Liptay, executrix; Mark A. Check, Hopewell Junction, NY (US); Mark S. Farrell, Pleasant Valley, NY (US); Bruce C. Giamei, Poughkeepsie, NY (US); Charles F. Webb, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 108 days.

(21) Appl. No.: 10/042,534

(22) Filed: Jan. 9, 2002

(65) Prior Publication Data

US 2003/0131199 A1 Jul. 10, 2003

(51) Int. Cl.[7] .............................................. G06F 12/00
(52) U.S. Cl. ........................................ 711/137; 712/207
(58) Field of Search .................. 711/137; 712/205–207, 712/228, 240, 245, 248

(56) References Cited

U.S. PATENT DOCUMENTS

| | | | | |
|---|---|---|---|---|
| 5,625,808 A | | 4/1997 | Webb et al. ................. | 712/248 |
| 5,634,119 A | * | 5/1997 | Emma et al. ............... | 712/240 |
| 5,748,951 A | * | 5/1998 | Webb et al. ................. | 712/245 |
| 6,088,792 A | | 7/2000 | Slegel et al. ................ | 712/228 |

* cited by examiner

Primary Examiner—Nasser Moazzami
(74) Attorney, Agent, or Firm—Lynn Augspurger; Cantor Colburn LLP

(57) ABSTRACT

A method is disclosed for instructing a computing system to ensure that a line is present in an instruction cache that includes selecting a line-touch instruction, recognizing the line-touch instruction as a type of branch instruction where the branch is not taken, executing the line-touch instruction to fetch a target line from a target address into the instruction cache, and interlocking the execution of the line-touch instruction with the completion of the fetch of the target line in order to prevent execution of the instruction following the line-touch instruction until after the target line has reached the cache.

21 Claims, 2 Drawing Sheets

METHOD FOR ENSURING THAT A LINE IS PRESENT IN AN INSTRUCTION CACHE

BACKGROUND

Some processors use millicode routines to implement certain complex system functions. For some of these system functions it is necessary that there be no unrelated cache activity while the function is executing, such as, for example, loading lines into the cache or translating addresses. For example, when updates to the time-of-day clock are taking place, they must occur within a certain amount of time and cannot tolerate long delays. Also, for certain operations related to the translator, the translator cannot be called upon to do unrelated translations during the operation. In addition, the protocols for communicating with a cache are such that when a locked line is held by millicode, no operations may be initiated that require completion before the line is released. If any such operations are initiated, there is a possibility of deadlocking the system.

For prior processors having a single cache used for operands, these problems have been dealt with by making sure that all lines that might be referenced during the function were in the cache before the function began. This was assured by making a line-touch reference to the lines just before beginning the function. This caused any lines that were not already in the cache to be loaded, so that during execution of the function the data would be found in the cache. This was accomplished using an ordinary instruction that caused a fetch from the storage locations in the line.

Unfortunately, for processors employing separate operand and instruction caches, the above technique only works to make sure that operand data is in the operand cache. Accordingly, for such processors it is desirable to provide an instruction that can be used to make a line-touch reference to locations from which instructions will be fetched in order to make sure that they are in the instruction cache.

SUMMARY

This disclosure presents a method for instructing a computing system to ensure that a line is present in an instruction cache that includes selecting a line-touch instruction, recognizing the line-touch instruction as a type of branch instruction where the branch is not taken, executing the line-touch instruction to fetch a target line from a target address into the instruction cache, and interlocking the execution of the line-touch instruction with the completion of the fetch of the target line in order to prevent execution of the instruction following the line-touch instruction until after the target line has reached the cache.

BRIEF DESCRIPTION OF THE DRAWINGS

The present disclosure will be better understood, and its numerous features and advantages will become apparent to those skilled in the pertinent art by referencing the accompanying drawings, in which.

DETAILED DESCRIPTION

An exemplary line-touch instruction is provided that makes a fetch to the instruction cache rather than to the operand cache. The instructions that reference the instruction cache are branches, but instruction processing is not transferred to the location addressed when fetching lines to the cache. Therefore, the exemplary line-touch instruction is a type of branch-not-taken. More specifically, the exemplary line-touch instruction is a Branch on Condition Relative instruction with a mask of zeros. Since this branch is never taken, it is effectively a No Operation ("NOP"), and normally it would not even be recognized as a branch instruction. However, the implementation of this exemplary line-touch instruction is herein recognized as a branch, and causes a fetch to be made from the target address to the instruction cache.

In general, branches can execute before a request to the target address is completed. Therefore, the implementation of the exemplary line-touch instruction interlocks the execution of the line-touch instruction with the completion of the target fetch. This is accomplished by setting a line-touch bit in the instruction buffer assigned to the target address to mark it as being for a line-touch instruction. This bit is turned off when the fetch is completed. As long as the line-touch bit is on in any instruction buffer, the line-touch instruction is not allowed to complete execution. This operation is all conditioned upon being in millicode mode ("milli-mode") because there is currently no reason to have this capability available in normal mode, such as, for example, normal IBM® System/390® mode.

Figure 1:
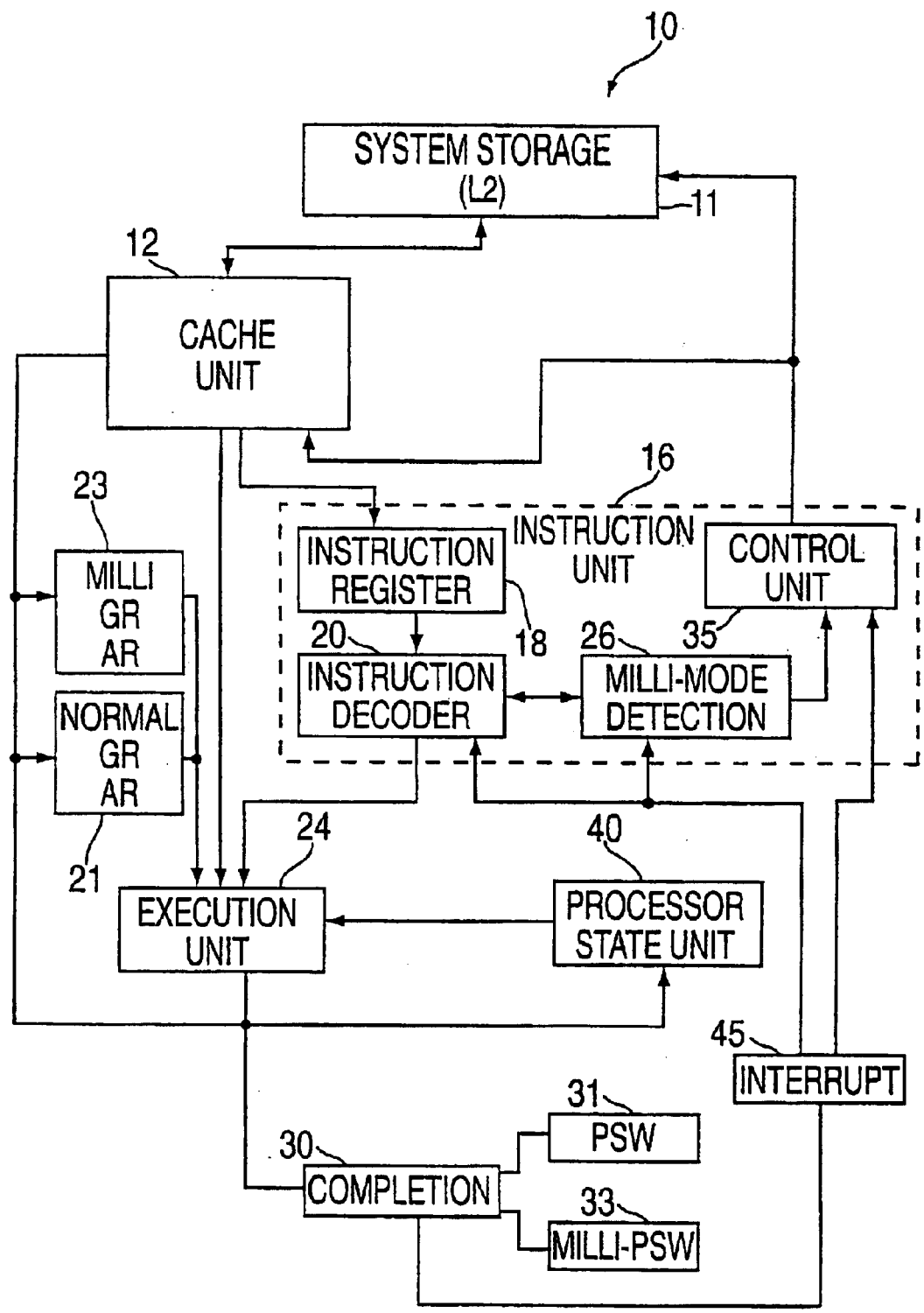
FIG. 1 shows a block diagram of an exemplary embodiment processing system.

In FIG. 1, reference numeral 10 generally indicates a portion of an exemplary processor, such as, for example, an IBM® BlueFlame® processor. The processor 10 includes a system storage unit 11, and an instruction cache portion of a memory unit 12. The storage unit 11 contains the program instructions that the processor is to execute as well as the data that those instructions are to manipulate. The instruction cache portion of the memory unit 12, which includes a copy of the instructions that the processor is presently executing, is the instruction cache portion of a split cache memory unit providing interleaved double word addressing in this exemplary embodiment. The instruction cache memory 12 logically includes contiguously addressable storage for both normal mode architected instructions (i.e., instructions directly executable in hardware) and milli-mode instructions (e.g., instructions indirectly executable by intermediate millicode routines, and special milli-mode only instructions unavailable in normal mode). An instruction unit subsystem 16 includes an instruction buffer (not shown), instruction registers 18 (only one shown), and an instruction decoder 20. The instruction unit subsystem receives architected instructions and millicode instructions from the instruction cache portion of the memory unit 12, and data from an operand or data cache portion of the memory unit 12. Instructions are parsed and placed into the instruction registers 18. The decoder 20 reads the contents of the instruction registers 18, decodes each instruction (or causes an operation exception in the case of an invalid instruction), and passes the instruction to an instruction queue for sequential execution by a hardware execution unit 24 (only one shown). Each hardware execution unit 24 has access to a set of general-purpose registers and access registers 21 for normal architected instruction execution and to a set of general-purpose registers and access registers 23 for millicode instruction execution. Control logic controls the exchange of data between the two sets of registers when beginning or terminating a millicode routine.

Milli-mode detection logic 26 is coupled to the instruction registers and detects when an instruction that is being decoded is of a type to be interpreted in a milli-mode operation. When this occurs, the milli-mode detection logic 26 generates an entry point address and passes this address along to the instruction fetch control logic 35 and places the decoder 20 into a milli-mode operating state. In this state the decoder 20 is enabled to decode milli-mode instructions. Milli-mode instructions include vertical millicode, including a mixture of normal architected instructions and special milli-mode only instructions, each of which can be executed in the hardware execution unit 24. The special milli-mode only instructions provide control functions needed by the millicode routines. The millicode routines reside outside of the program addressable storage.

The system effects of an executed instruction are architecturally visible in the completion logic 30. Signal lines between the completion logic 30 and the decoder 20 allow the decoder 20 to keep track of instruction completion. A program status word ("PSW") in register 31 controls execution of the main program. Similarly, the system also includes a milli-mode PSW register 33, which controls execution of each milli-mode routine. Both the execution unit 24 and the completion logic 30 are connected to read from and write to the PSW and the milli-mode PSW registers, 31 and 33, respectively. Thus, at any given point the execution units or the completion logic can read or update the appropriate one of the PSW or milli-mode PSW registers.

A processor state unit 40 maintains the entire updated status of the architected system both in normal mode and milli-mode operation. In the event of a detected error, the processor state unit 40 provides a resource to recreate the status of the system from a checkpoint state in order to allow a retry of the error causing operation.

Milli-mode is enabled when the milli-mode detection logic 26 recognizes that the instruction being decoded is to be implemented with millicode. In response to this recognition, the detection logic 26 sends appropriate signals to the decoder 20, the instruction fetch controls 35, and register controls in the execution unit 24. In response to the milli-mode recognition signal from the detection logic 26, the decoder 20 suspends normal mode decoding, and the execution unit register control copies the contents of the normal registers 21 to the milli-mode registers 23 and causes the system to subsequently use the milli-mode registers 23. The milli-mode detection logic 26 generates a millicode entry point address. This entry point address is used by the control logic 35 to address the instruction cache 12. Milli-mode instructions from the cache are sent to the instruction registers 18 where the decoder 30 decodes them and schedules the decoded instructions for execution.

When the processor enters milli-mode, it executes and completes the instructions already in the pipeline conceptually prior to the instruction that caused entry into milli-mode. As the processor completes the preceding instructions, it updates the appropriate general-purpose registers 21. Next, the processor decodes and executes the millicode instructions that implement the instruction that caused entry into milli-mode.

At some point the instruction immediately prior to the instruction that caused entry to milli-mode will be indicated completed in the completion logic 30. Only then does the processor begin to complete the milli-mode instructions. The processor then continues decoding, executing and completing the millicode instructions.

Eventually, the detection logic 26 recognizes a millicode END ("MEND") milli-mode instruction. When the detection logic 26 detects a MEND instruction, it causes the processor to cease fetching milli-mode instructions. Further, when MEND is detected, the detection logic puts the decoder in normal mode and causes the processor to begin fetching instructions. Millicode explicitly updates all registers, so there is no transfer of register content when going from milli-mode operation to normal mode operation. Thus, completion of a MEND milli-mode instruction causes the processor completion logic 30 to begin executing and completing normal instructions.

The processor can also enter milli-mode in response to an interrupt. This is typically the case with updates to the time-of-day clock, for example. When the completion logic 30 detects an interrupt, the interrupt priority logic 45 determines that an interrupt is to be serviced and it signals a fetch by the instruction unit 16, causing the decoder 20 to initiate milli-mode for interrupt service routines implemented in millicode. The recognition of an interrupt condition causes the processor to halt normal mode execution at the next interruptible point. The interrupt priority logic 45 also generates control inputs that are used by the milli-mode detection logic to generate an entry point address with which to address the instruction cache. These milli-mode instructions are sent to the instruction registers where the decoder 20 decodes them and schedules them for execution at the appropriate hardware execution unit 24.

The processor 10 proceeds to decode, execute and complete the millicode instructions in the milli-mode routine for interrupts. Eventually, the decoder 20 recognizes a MEND milli-mode instruction. This causes the decoder 20 to stop decoding in milli-mode. Depending on whether or not there are additional interrupts that require servicing, the decoder 20 will either redo the interrupt process or return to decoding normal instructions from the cache.

Figure 2:
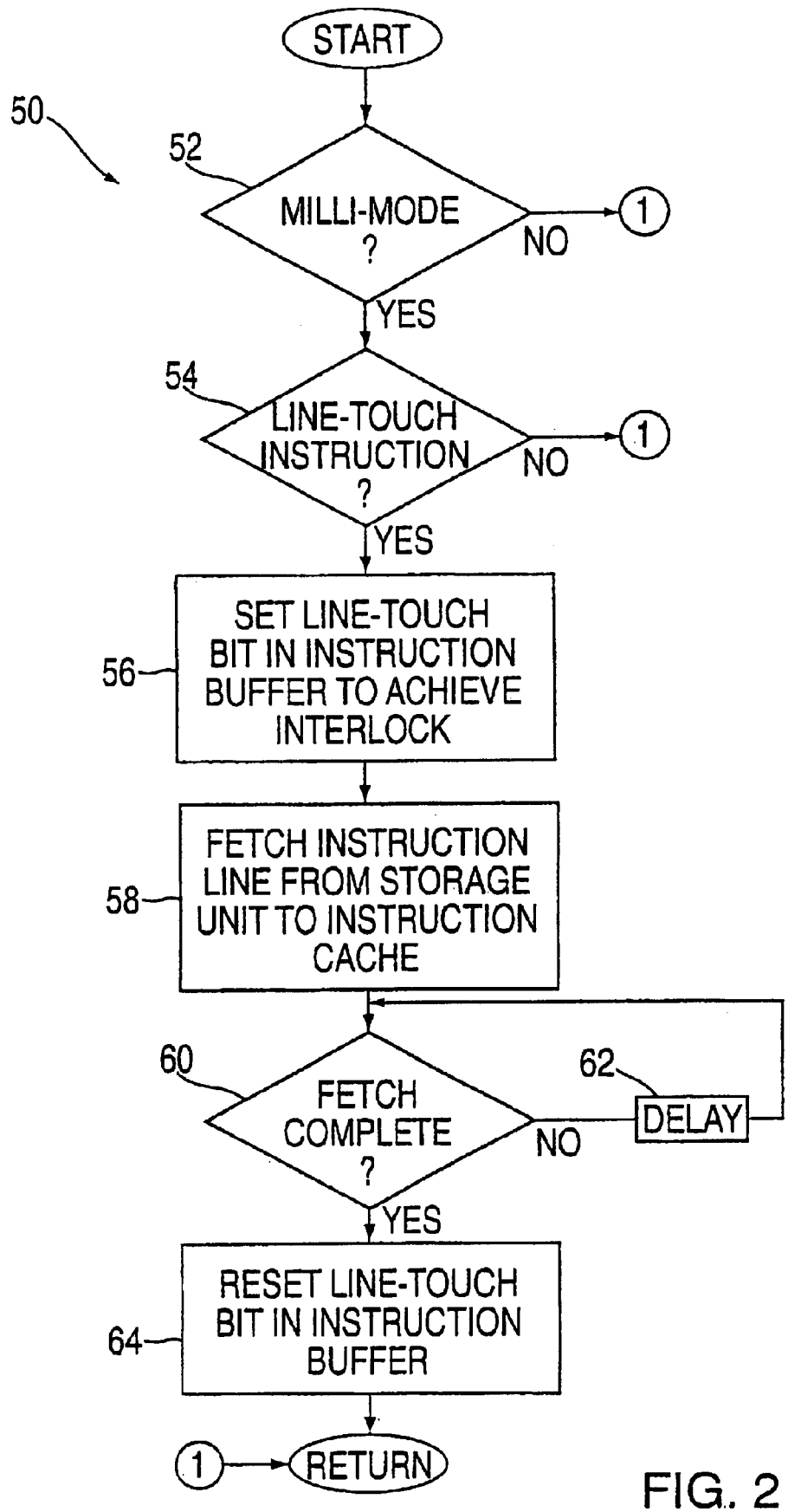
FIG. 2 shows a flowchart for a line-touch instruction usable in the processing system of FIG. 1.

Turning now to FIG. 2, a method of operation for an exemplary line-touch instruction upon the exemplary processor 10 of FIG. 1 is generally indicated by the reference numeral 50. The method 50 ensures that a line is present in the instruction cache 12 of FIG. 1. In operation, decision block 52 determines whether the processor 10 is in milli-mode. If the processor 10 is in milli-mode, decision block 54 determines whether the instant instruction is a line-touch instruction.

If the instant instruction is a line-touch instruction, operation block 56 sets the line-touch bit in the instruction buffer holding the instant instruction in order to achieve an interlock condition and prevent subsequent instructions from executing until the interlock condition is released. Next, operation block 58 accomplishes a fetch of the desired instruction line from system storage 11 to cache unit 12. Decision block 60 checks to determine whether the fetch has been completed. If the fetch has not yet completed, a delay 62 is effected before decision block 60 is executed again. Once decision block 60 finds that the desired fetch has been completed, operation block 64 resets the line-touch bit in the instruction buffer in order to release the interlock condition.

An advantage of the described exemplary embodiment is that a systems programmer may ensure that an instruction will be available in the instruction cache by using the provided line-touch instruction to fetch a line to the instruction cache, such as when writing millicode for a delay-intolerant systems function.

While exemplary embodiments have been shown and described, various modifications and substitutions may be made thereto without departing from the spirit and scope of the disclosure. Accordingly, it is to be understood that the present disclosure has been made by way of illustration only, and such illustrations and embodiments as have been disclosed herein are not to be construed as limiting to the claims.

What is claimed is:

1. A method of instructing a computing system to ensure that a target line is present in an instruction cache, comprising:
    selecting a line-touch instruction;
    recognizing said selected line-touch instruction as a branch-not-taken;
    interlocking the execution of said line-touch instruction with a completed fetch of said target line; and
    executing said selected line-touch instruction to fetch said target line from a target address to the instruction cache.

2. A method as defined in claim 1 wherein the line-touch instruction comprises a Branch on Condition Relative instruction having a mask of zeros.

3. A method as defined in claim 1, further comprising:
    executing an instruction immediately following the line-touch instruction rather than the target line upon completed execution of the line-touch instruction.

4. A method as defined in claim 1 wherein:
    interlocking comprises setting a line-touch bit in an instruction buffer containing the line-touch instruction, and continuing to process only the line-touch instruction until the fetch has been completed.

5. A method as defined in claim 4, father comprising:
    resetting the line-touch bit upon completion of the fetch.

6. A method of selecting instruction data in a computing system having an instruction cache and an instruction buffer, the method comprising:
    receiving a line-touch instruction into the instruction buffer;
    interlocking the execution of said line-touch instruction with the completed fetch of said target line; and
    executing said line-touch instruction to fetch a target line from a target address to the instruction cache.

7. A method as defined in claim 6 wherein the line-touch instruction comprises a Branch on Condition Relative instruction having a mask of zeros.

8. A meted as defined in claim 6, further comprising:
    executing an instruction immediately following the line-touch instruction rather than the target line upon completed execution of the line-touch instruction.

9. A method as defined in claim 6 wherein:
    interlocking comprises setting a line-touch bit in said instruction buffer, and continuing to process only the line-touch instruction until to fetch has been completed and the line-touch bit reset.

10. A method for providing timely instruction in a computing system having a storage unit, an instruction cache, and an instruction buffer; the method comprising:
    determining that a millicode routine comprising lines is delay-intolerant;
    programming the lines of to millicode routine in milli-mode;
    providing a line-touch instruction referencing a target line of the millicode routine;
    receiving the line-touch instruction into the instruction buffer;
    executing the line-touch instruction to fetch the target line from the storage unit into the instruction cache;
    interlocking the execution of the line-touch instruction with the completed fetch of the target line;
    executing an instruction immediately following the line-touch instruction regardless of the position of the target line upon completed execution of the line-touch instruction; and
    finding the target line in the cache at the time that the target line is reached for execution.

11. A method as defined in claim 10 wherein the line-touch instruction comprises
    a plurality of line-touch instructions, each of the plurality of line-touch instructions corresponding to a different one of the lines in the millicode routine.

12. A method as defined in claim 10 wherein the computer system further comprises a data cache.

13. A method for ensuring that an instruction line is present in a cache memory of a computer system having a translator and a cache memory; the method comprising:
    providing a branch instruction that references the instruction line;
    translating an address corresponding to the instruction line;
    selecting an instruction line at the translated address;
    interlocking the substantial completion of translating and selecting; and
    exiting the branch instruction without branching upon the release of the interlock on the completion of translating and selecting to thereby avoid conflicts and deadlocks.

14. A method as defined in claim 13, further comprising:
    retrieving the instruction line selected by at least one of the translated and selected addresses.

15. A method as defined in claim 13 wherein the computer system comprises a microprocessor.

16. A method as defined in claim 13 wherein the translated address corresponds to an absolute address.

17. A method as defined in claim 13 wherein the cache memory comprises an instruction cache memory and a data cache memory.

18. A method as defined in claim 13 wherein the branch instruction is not permitted to branch to the address of the instruction line.

19. A method as defined in claim 13 wherein the branch instruction fetches the address of the instruction line.

20. A method as defined in claim 13 wherein providing the branch instruction comprises altering the millicode of a standard instruction.

21. A method as defined in claim 13 wherein the cache memory comprises a plurality of instruction cache memories.

* * * * *